United States Patent
Kuipers

(10) Patent No.: US 11,958,533 B2
(45) Date of Patent: Apr. 16, 2024

(54) MULTI-BEAM SIDE FRAME ASSEMBLY

(71) Applicant: Shape Corp., Grand Haven, MI (US)

(72) Inventor: Matthew Kuipers, Holland, MI (US)

(73) Assignee: Shape Corp., Grand Haven, MI (US)

(*) Notice: Subject to any disclaimer, the term of this patent is extended or adjusted under 35 U.S.C. 154(b) by 217 days.

(21) Appl. No.: 17/692,975

(22) Filed: Mar. 11, 2022

(65) Prior Publication Data
US 2022/0289298 A1 Sep. 15, 2022

Related U.S. Application Data

(60) Provisional application No. 63/160,364, filed on Mar. 12, 2021.

(51) Int. Cl.
| | | |
|---|---|---|
| *B62D 21/15* | (2006.01) | |
| *B62D 29/00* | (2006.01) | |
| *B60K 1/04* | (2019.01) | |
| *B62D 25/02* | (2006.01) | |

(52) U.S. Cl.
CPC ......... *B62D 21/157* (2013.01); *B62D 29/007* (2013.01); *B60K 1/04* (2013.01); *B60K 2001/0438* (2013.01); *B60Y 2306/01* (2013.01); *B62D 25/025* (2013.01)

(58) Field of Classification Search
CPC ............. B62D 29/007; B62D 25/025; B62D 25/2036; B60K 2001/0438; B60K 1/04; B60Y 2306/01
USPC ................ 296/209, 187.08, 187.12
See application file for complete search history.

(56) References Cited

U.S. PATENT DOCUMENTS

| | | | |
|---|---|---|---|
| 6,378,933 B1* | 4/2002 | Schoen ................ | B62D 29/002 296/203.02 |
| 10,029,734 B2* | 7/2018 | Akhlaque-e-rasul ........................ | B62D 21/157 |
| 10,843,736 B2* | 11/2020 | Tchepikov ........... | B62D 25/025 |
| 2017/0144706 A1 | 5/2017 | Bach | |
| 2018/0370573 A1 | 12/2018 | Yang et al. | |
| 2019/0248423 A1 | 8/2019 | Kato et al. | |

FOREIGN PATENT DOCUMENTS

JP 2020104602 A 7/2020

OTHER PUBLICATIONS

International Search Report for Application No. PCT/US2022/020003; mailed Jul. 6, 2022, 5 pp.

* cited by examiner

*Primary Examiner* — Amy R Weisberg
*Assistant Examiner* — Dana D Ivey
(74) *Attorney, Agent, or Firm* — Bodman PLC

(57) ABSTRACT

A side frame assembly for a vehicle includes a rocker structure and an inboard stiffening beam. The rocker structure includes a metal sheet that has longitudinal bends along a length of the rocker structure separating the upper wall, the lower wall, and the inner wall of the rocker structure. The inboard stiffening beam is disposed along an inboard-facing surface of the inner wall of the rocker structure. The inboard stiffening beam includes a second metal sheet that is formed to define a tubular shape along a length of the inboard stiffening beam. The tubular shape includes a planar upper wall and/or a planar lower wall, the planar extent of which intersects a portion of the rocker structure, such as the inner wall, to form a lateral load path from the rocker structure to the tubular shape of inboard stiffening beam.

19 Claims, 6 Drawing Sheets

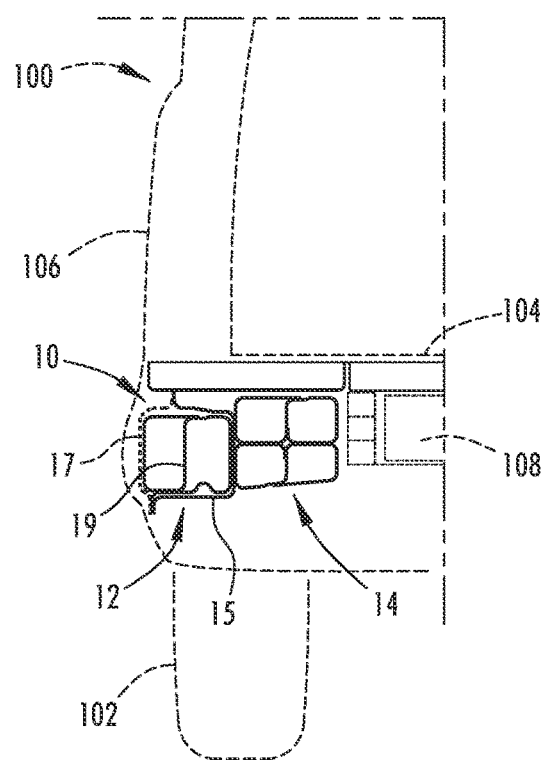
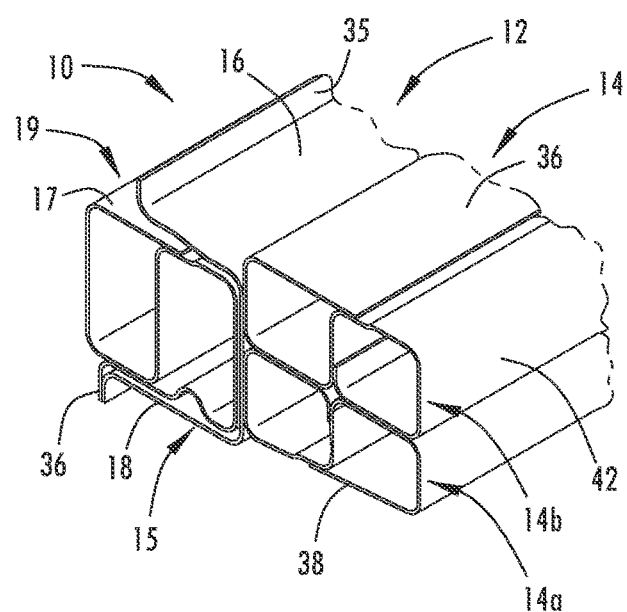
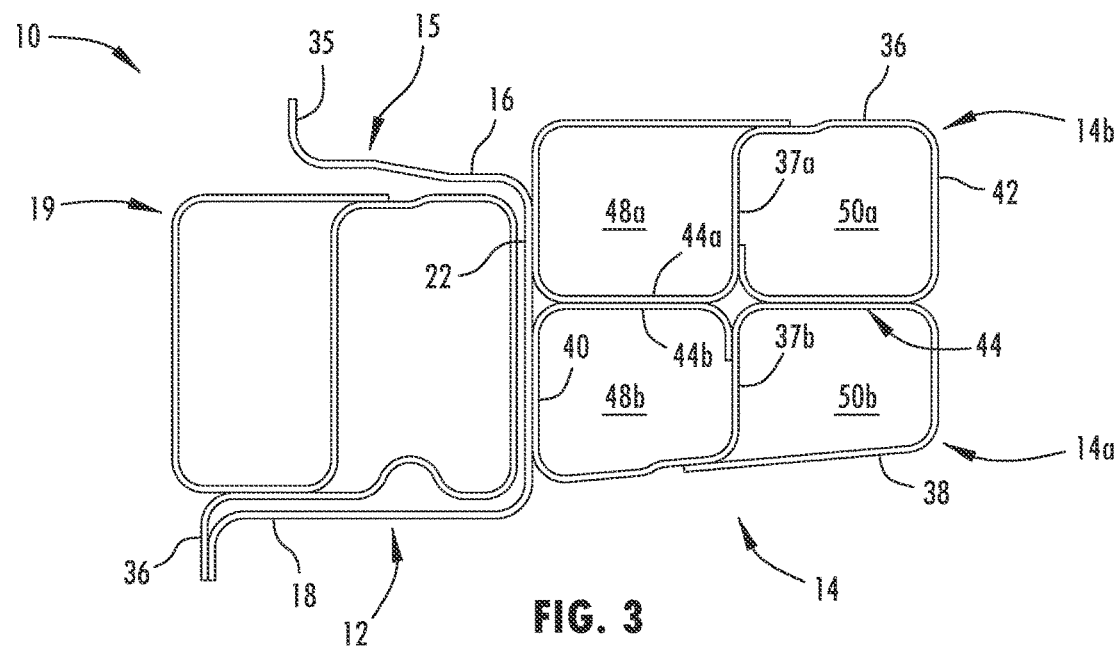

MULTI-BEAM SIDE FRAME ASSEMBLY

CROSS-REFERENCE TO RELATED APPLICATION

This application claims benefit and priority under 35 U.S.C. § 119(e) of U.S. provisional application Ser. No. 63/160,364, filed Mar. 12, 2021, the contents of which are hereby incorporated herein by reference in its entirety.

TECHNICAL FIELD

The present disclosure relates to multi-beam frame assemblies for vehicles, and more particularly to rocker structures and side frame assemblies, sub-assemblies, and the like.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at the rocker structures that run longitudinally between the front and rear wheels along the lower outboard portions of the vehicle frame.

With the incorporation of battery trays in electric and hybrid electric vehicles in the lateral inboard area between opposing rocker structures, it is desirable for the side impact intrusion distance to be reduced in order to maximize available battery storage volume in the battery trays. For example, it is generally known to increase stiffness of a rocker structure to reduce the inboard distance of a side impact intrusion. However, increasing stiffness of a rocker structure often involves adding internal reinforcements to the rocker structure that can undesirably add mass, complexity, and expense.

SUMMARY

One aspect of the disclosure provides a side frame assembly for a vehicle that includes a rocker structure having an upper wall, a lower wall, and an inner wall together extending along a length of the rocker structure. The rocker structure includes a metal sheet that has longitudinal bends along a length of the rocker structure separating the upper wall, the lower wall, and the inner wall of the rocker structure. The side frame assembly also includes an inboard stiffening beam that is disposed along an inboard-facing surface of the inner wall of the rocker structure. The inboard stiffening beam includes a second metal sheet that is formed to define an enclosed tubular shape along a length of the inboard stiffening beam. The enclosed tubular shape includes a planar upper wall and/or a planar lower wall. The planar extent of the planar upper wall or the planar lower wall intersects a portion of the rocker structure, such as the inner wall, to form a lateral load path from the rocker structure to the enclosed tubular shape of inboard stiffening beam.

Implementations of the disclosure may include one or more of the following optional features. In some implementations, the planar extent of the planar lower wall of the enclosed tubular shape of the inboard stiffening beam intersects the inner wall of the rocker structure. In some examples, the planar extent of the planar upper wall of the enclosed tubular shape of the inboard stiffening beam intersects the inner wall of the rocker structure. In some implementations, the upper wall of the rocker structure is substantially aligned with or intersecting a portion of the inboard stiffening beam.

The enclosed tubular shape of the inboard stiffening beam, in some examples, includes two separate tubular sections that share a common center wall. For example, the second metal sheet may include longitudinal bends that form a multi-tubular shape. In some implementations, the planar extent of the common center wall may intersect the inner wall of the rocker structure. The inboard stiffening beam, in some examples, includes an upper tubular section and a lower tubular section along the length of the inboard stiffening beam. In some implementations, a third metal sheet forms the lower tubular section, such that the second metal sheet may be coupled to the third metal sheet along the length of the inboard stiffening beam.

In some implementations, the rocker structure includes a stiffening insert disposed at the outboard-facing surface of the inner wall. The rocker structure may include an upper flange that extending upward from the upper wall, such that the upper flange is configured to attach to an outer sill.

In some implementations, an inboard-facing surface of the inboard-stiffening beam is configured to couple with a battery tray. In additional implementations, the first and second metal sheets each comprise a martensitic steel with a tensile strength of at least 1,500 MPa.

Another aspect of the disclosure provides a side frame assembly for a vehicle that includes a rocker structure that has a first metal sheet extending along a length of the rocker structure. The side frame assembly also includes an inboard stiffening beam that is disposed along an inboard-facing surface the rocker structure. The inboard stiffening beam includes a second metal sheet that extending at least partially along the length of the rocker structure. The second metal sheet is formed to define a tubular shape with a planar wall bordering the tubular shape. The planar wall of the inboard stiffening beam defines a lateral impact load path that extends from an outer side wall of the rocker structure to an inner side wall of the inboard stiffening beam along the planar wall of the tubular shape.

According to another aspect of the disclosure, a side frame assembly for a vehicle includes a rocker structure that has an inner sill with an upper wall, a lower wall, and an inner wall together extending along a length of the rocker structure. The inner sill includes a first metal sheet that has longitudinal bends along a length of the rocker structure separating the upper wall, the lower wall, and the inner wall of the inner sill. The inboard stiffening beam is disposed along an inboard-facing surface of the inner wall of the inner sill. The inboard stiffening beam includes a second metal sheet that is formed to define two enclosed tubular shapes along a length of the inboard stiffening beam. At least one of the two enclosed tubular shapes have a planar lower wall, the planar extent of which intersects the inner wall of the inner sill to form a lateral load path from the rocker structure to the inboard stiffening beam.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

FIG. 1 is a cross-sectional view of an exemplary side region of a vehicle taken transverse to the length of the vehicle and showing a side frame assembly.

FIG. 2 is a perspective view of the side frame assembly of FIG. 1.

FIG. 3 is a cross-sectional view of the side frame assembly of FIG. 1.

Like reference numerals indicate like parts throughout the drawings.

DETAILED DESCRIPTION

Figure 4:
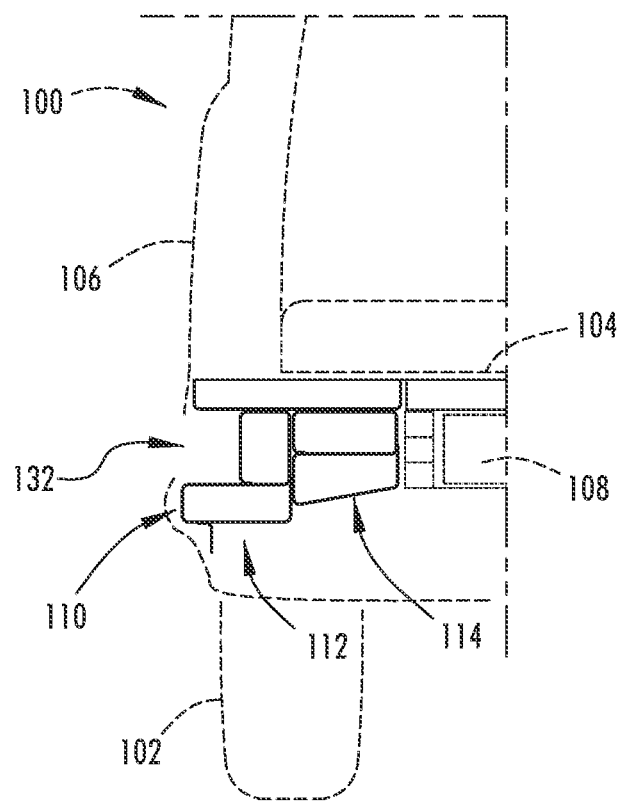
FIG. 4 is a cross-sectional view of an exemplary side region of a vehicle taken transverse to the length of the vehicle and showing a side frame assembly.

The present disclosure relates generally to a vehicle side frame assembly, subassemblies, and components thereof. Embodiments of the present disclosure provide technical solutions to a number of technical problems in the art.

Referring now to the drawings and the illustrative examples depicted therein, a side frame assembly 10 for a vehicle 100, such as shown in FIG. 1, has a rocker structure 12 and an inboard stiffening beam 14 that is disposed along and attached at an inboard-facing surface the rocker structure 12. In some examples, the inboard stiffening beam 14 may extend along the entire length of the rocker structure 12. In other examples, the inboard stiffening beam 14 may extend along a select longitudinal section of the length of the rocker structure 12, such as at the central section of the rocker structure 12. The rocker structure 12 of the side frame assembly 10 extends longitudinally in alignment with the length direction of the vehicle 100 and is disposed along a section of the length of the vehicle 100 in the area between the wheels 102 of the vehicle 100. The rocker structure 12 is generally positioned along an outboard side of the vehicle frame and near or below the floor 104 of the vehicle 100 that is used to support occupants, cargo, and the like. In the implementation shown in FIG. 1, the rocker structure 12 also is arranged below a side door 106 of the vehicle 100. The side door 106 may be a hinged door or a sliding door that operably encloses a side door opening defined by a body-side panel or panels of the vehicle.

As further shown in the example provided in FIG. 1, the vehicle 100 includes a battery tray 108 mounted inboard from the side frame assembly 10 that encloses battery or batteries that are at least partially used to operate a propulsion system of the vehicle 100, such as a traction battery or battery modules or the like. The battery tray 108 may be supported at or below the floor 104 and generally between the front and rear wheels 102 of the vehicle 100 to distribute the battery weight and establish a low center of gravity for the vehicle. The vehicle for purposes of the disclosure may be any type of land motor vehicle, such as a car, truck, bus, van, sport utility vehicle, or the like, including those used for passenger travel, cargo shipping, or any other personal, governmental, or commercial purposes.

As shown in FIGS. 1-3, the rocker structure 12 of the side frame assembly 10 includes an upper wall 16, a lower wall 18, and an inner side wall 22 together extending along a length of the rocker structure 12. In the example shown in FIGS. 1-3, the rocker structure 12 includes an inner sill 15, an outer sill 17, and a reinforcement insert 19. The metal sheet of the inner sill 15 is a unitary structure or piece that forms the upper wall 16, the lower wall 18, and the inner side wall 22 as integral portions of the metal sheet. By forming the metal sheet of the inner sill 15, such as by roll forming, press bending, stamping, or similar forming process, the inner sill 15 may have a consistent transverse cross-sectional shape extending along the length of the rocker structure 12.

As also shown in FIGS. 1-3, the rocker structure 12 includes a multi-tubular shape. In some examples, the reinforcement insert 19 may include an roll formed metal sheet, such as shown in FIGS. 1-3 having a multi-tubular shape extending along the length of the reinforcement insert 19. The reinforcement insert 19 may be disposed between the inner sill 15 and the outer sill 17 to stiffen the rocker structure to a threshold stiffness. A separate metal sheet of the reinforcement insert 19 is roll formed to provide a mono-leg shaped profile defined by an outer tubular section and an inner tubular section that share a common center wall. The metal sheet is formed to displace the lateral portions of the metal sheet that extend from the opposing ends of the common center wall in the same rotational direction around the common center wall. The lateral portions of the metal sheet are successively imparted with longitudinal bends in a process, such as a result of passing the sheet through a series of roll-forming tools, which displaces the edges of the metal sheet at or near the common center wall. In doing so, the outer tubular section encloses an outer elongated hollow area and the inner tubular section encloses an inner elongated hollow area, which are separated by the common center. To enclose the tubular or multi-tubular shapes of the reinforcement insert 19, the edge portions of the metal sheet are welded continuously or intermittently along the length of the rocker structure 12.

The cross-sectional shape of the rocker structure 12 provides multiple walls and corresponding load paths for side impact forces from the outer sill 17 to the inner sill 15. Further, the rocker structure 12 may be formed to have one or more enclosed tubular sections, such as at the reinforcement insert, or to have an open profile (i.e., lacking any enclosed tubular sections).

As further shown in FIGS. 1-3, a floor section 34, such as a step pad or other outboard floors section, is supported at the upper portion of the rocker structure, such as an upper flange 35 that extends upward from the upper wall 16. The outer sill 17 of the rocker structure 12 may be configured to receive additional trim or body panels to conceal and protect the outer sill panel 17. In addition, the rocker structure 12 may include a lower flange 36 that extends downward from the lower wall 18, such as shown in FIG. 1 with the lower flange 36 attached to a body panel. In the example, a batter tray 108 is mounted inboard from the rocker structure 12, such that the side frame assembly is configured to manage lateral impact energy, such as to assist with preventing intrusion into the battery tray 108 from lateral impact forces.

As shown in FIGS. 1-3, the inboard stiffening beam 14 is disposed along an inboard-facing surface the rocker structure 12. The inboard stiffening beam 14 of the side frame assembly 10 includes an upper wall 36, a lower wall 38, an outer side wall 40, an inner side wall 42, and a center wall 44 together extending along a length of the inboard stiffening beam 14. As shown in FIG. 1, the inboard-facing surface of the inboard-stiffening beam 14 may be configured to couple with the battery tray 108, such as to at least partially support the battery tray.

The inboard stiffening beam 14 includes at least one other formed metal sheet that has bends along the length of the inboard stiffening beam to define at least one an enclosed tubular shape, such as the multi-tubular shape shown in FIG. 3. Specifically, the inboard stiffening beam 14 shown in FIGS. 1-3 includes an upper beam 14a formed by a metal sheet to provide the upper wall 36 and a lower beam 14b formed by a metal sheet to provide the lower wall 38. The metal sheets of the inboard stiffening beams 14a, 14b are each roll formed to provide a mono-leg shaped profile defined by an outer tubular section and an inner tubular section that share a common center wall 37a, 37b. More specifically, the metal sheets are each formed to displace the lateral portions of the respective metal sheet that extend from the opposing ends of the center wall 37a, 37b in the same rotational direction around the center wall 37a, 37b. The lateral portions of the metal sheet are successively imparted with longitudinal bends in a process, such as a result of passing the sheet through a series of roll-forming tools, which displaces the edges of the metal sheet at or near the center wall 37a, 37b. In doing so, the outer tubular section encloses an outer elongated hollow area 48a, 48b and the inner tubular section encloses an inner elongated hollow area 50a, 50b, which are separated by the center wall 37a, 37b.

To enclose the tubular or multi-tubular shapes of the inboard stiffening beam 14, the edge portions of the metal sheet or sheets are welded continuously or intermittently along the length of the inboard stiffening beam 14. The edge of the metal sheet forming the upper beam 14a shown in FIG. 3 is bent into the inner elongated hollow area 50a and attached via welding to the center wall 37a, such as with a seam weld. The other edge of the metal sheet forming the upper beam 14a is attached via welding to the upper wall 36 slightly above the upper end of the center wall 37a in a lap joint configuration. Similarly, the edge of the metal sheet forming the lower beam 14b shown in FIG. 3 is bent into the outer elongated hollow area 48b and attached via welding to the center wall 37b, such as with a seam weld. The other edge of the metal sheet forming the lower beam 14b is attached via welding to the lower wall 38 slightly below the lower end of the center wall 37b in a lap joint configuration. The inner and outer wall sections of the respective upper and lower tubular sections or beams 14a, 14b are substantially aligned with each other in a vertical orientations to form the respective inner and outer side walls 40, 42. Also, the inner and outer side walls 40, 42 and the center walls 37a, 37b are in substantially parallel alignment with each other and generally in a vertical orientation. Similarly, the interfacing walls 44a, 44b of the upper and lower beams 14a, 14b (together forming a center wall 44 of the inboard stiffening beam) and the upper and lower walls 36, 38 are in substantially parallel alignment with each other and generally in a generally horizontal orientation.

As shown in FIG. 3, a lateral load path that is generally defined between the rocker structure and an intersecting planar wall portion of the inboard stiffening beam 14. The lateral load paths in the implementation shown in FIG. 3 extends from the inner side wall 22 of the sill inner of the rocker structure 12 along the interfacing walls 44a, 44b of the upper and lower beams 14a, 14b and the lower walls 38 of the inboard stiffening beam 14. As such that the planar extents of each of the walls of the inboard stiffening beam 14 that carry the lateral load path extend outboard and intersect the inner side wall 22 of the rocker structure 12.

The rocker structure 12 and the inboard stiffening beam 14 are each formed with a metal sheet, which may be the same or different type of metal. For example, one or both of the metal sheets may include a martensitic steel with a tensile strength of at least 1,500 MPa, such as 1,500 MPa or 1,700 MPa. Further, the metal sheets may have a thickness of about 1.4 mm, and in some examples may be approximately between 1 mm and 1.8 mm or more generally between 0.8 mm to 3.0 mm. In additional examples, the rocker structure and the inboard stiffening beam may have different shapes and orientations from that illustrated and may include alternative dimensions and proportions, such as for use with different types of vehicles.

Figure 5:
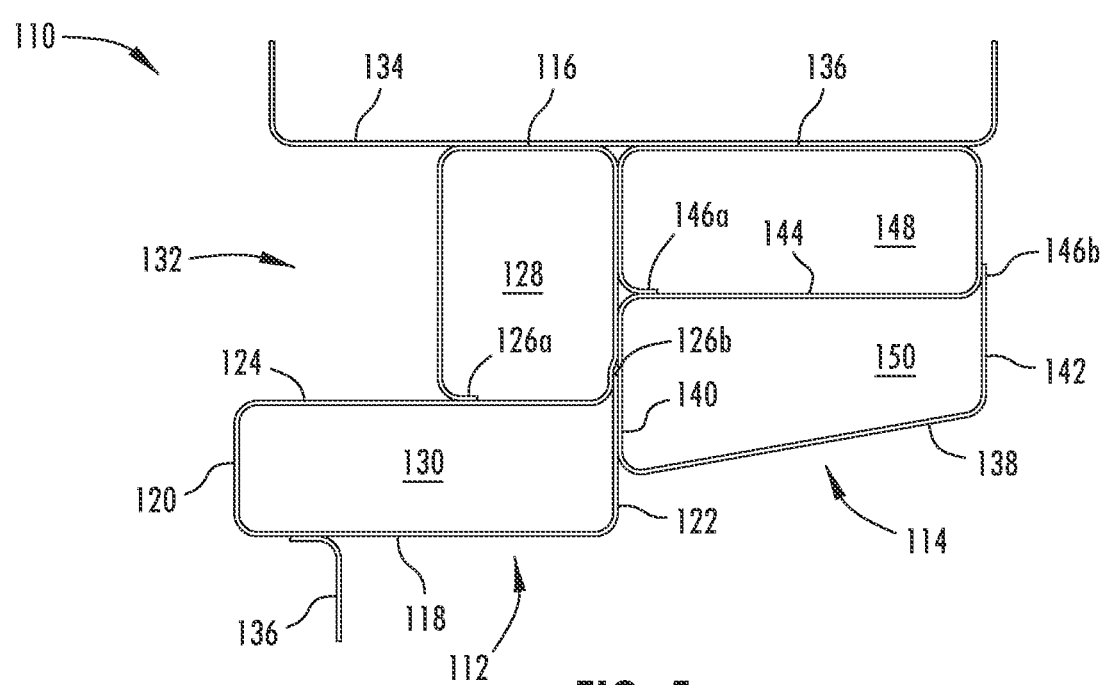
FIG. 5 is a cross-sectional view of the side frame assembly of FIG. 4.

As shown in FIGS. 4 and 5, the rocker structure 112 of the side frame assembly 110 includes an upper wall 116, a lower wall 118, an outer side wall 120, an inner side wall 122, and an intermediate wall 124 together extending along a length of the rocker structure 112. In the example shown in FIGS. 4 and 5, the rocker structure 112 is defined by a formed metal sheet, such that the rocker structure may be void of or otherwise lacking a sill inner and sill outer. The metal sheet of the rocker structure 112 provides the rocker structure 112 as a unitary structure or piece that forms the upper wall 16, the lower wall 118, the outer side wall 120, the inner side wall 122, and the intermediate wall 124 as integral portions of the metal sheet. By forming the metal sheet of the rocker structure 112, such as by roll forming, press bending, stamping, or similar forming process, the rocker structure 112 has a consistent transverse cross-sectional shape extending along the length of the rocker structure 112. The cross-sectional shape of the rocker structure 112 provides multiple walls and corresponding load paths for side impact forces, such that the cross-sectional shape that provides a rocker structure, which allows for the inner sill panel and/or the outer sill panels to be omitted or otherwise considered to be structurally incorporated, integrated, or otherwise built into the rocker structure 112. For example, the rocker structure 12 may be formed to have one or more enclosed tubular sections or to have an open profile (i.e., lacking any enclosed tubular sections).

As also shown in FIG. 5, the rocker structure 112 includes a multi-tubular shape. Specifically, the metal sheet of the rocker structure 112 is roll formed to provide a mono-leg shaped profile defined by an upper tubular section and a lower tubular section that share a common center wall, shown as the intermediate wall 124. More specifically, the metal sheet is formed to displace the lateral portions of the metal sheet that extend from the opposing ends of the intermediate wall 124 in the same rotational direction around the intermediate wall 124. The lateral portions of the metal sheet are successively imparted with longitudinal bends in a process, such as a result of passing the sheet through a series of roll-forming tools, which displaces the edges 126a, 126b of the metal sheet at or near the intermediate wall 124. In doing so, the upper tubular section encloses an upper elongated hollow area 128 and the lower tubular section encloses a lower elongated hollow area 30, which are separated by the intermediate wall 124 (i.e., the common center wall).

To enclose the tubular or multi-tubular shapes of the rocker structure 112, the edge portions of the metal sheet are welded continuously or intermittently along the length of the rocker structure 112. The outboard-positioned edge 126a of the metal sheet shown in FIG. 5 is bent into the upper elongated hollow area 128 and attached via welding to the upper surface of the intermediate wall 124, such as with a seam weld. By displacing the edge into the upper elongated hollow area 128, the edge 126a does not occupy or interfere with the outer exposed upper surface of the intermediate wall 124. The inboard-positioned edge 126b of the metal sheet is attached via welding to the inner side wall 122 slightly above the inboard end of the intermediate wall 124 in a lap joint configuration. The inner wall sections of the respective upper and lower tubular sections are substantially aligned with each other in a vertical orientation to form the inner side wall 122. Also, the upper and lower walls 116, 118 and the intermediate wall 124 are in substantially parallel alignment with each other and generally in a horizontal orientation.

As further shown in FIG. 5, the lower tubular section extends outboard from the upper tubular section to expose a portion of the upper surface of the intermediate wall 124 and further to provide an outboard-facing channel 132 along the length of the rocker structure 112. As such, with the inner wall 122 aligned and vertically oriented between the upper and lower tubular sections, the lower tubular section has a greater lateral width than the upper tubular section. That is, an upper end 120a of the outer side wall 120 of the rocker structure (shown at the lower tubular section) is vertically spaced from the upper wall 116 of the rocker structure 112 to form such as channel 132 along the length of the rocker structure 112. A floor section 134, such as a step pad or other outboard floors section, is supported at the upper wall 116 of the rocker structure, where the channel 132 may be further defined between the floor section 134 and the intermediate wall 124 of the rocker structure 112. The channel 132 along the rocker structure 112 may be configured to receive at least one of a rock rail bracket, a sliding door, or a step pad. For example, a sliding door mechanism or track component may be attached to the floor section 134 or rocker structure 112 in the channel 132 to conceal and protect such mechanism or component. To further conceal and prevent damage or debris accumulation on such mechanism or component mounted in the channel 132, additional trim or decorative body panels may be secured above and/or below the channel 132, such as the body-side panels shown above and below the channel 132 in FIG. 4. For example, the rocker structure 112 may include a lower flange 136 that extends downward from the lower wall 18, such as shown in FIG. 4 with the lower flange 136 attached to a body panel.

When a channel is provided at the rocker structure 112, such as for installing a rock rail bracket, a sliding door, or a step pad, the resulting energy absorption the rocker structure is capable of managing, such as form lateral side impact, may be reduced. In the example shown in FIG. 4, a batter tray 108 is mounted inboard from the rocker structure 112, such that the side frame assembly is configured to manage lateral impact energy, such as to assist with preventing intrusion into the battery tray 108 from lateral impact forces.

As shown in FIGS. 4 and 5, the inboard stiffening beam 14 is disposed along an inboard-facing surface the rocker structure 112, The inboard stiffening beam 114 of the side frame assembly 110 includes an upper wall 136, a lower wall 138, an outer side wall 140, an inner side wall 142, and a center wall 144 together extending along a length of the inboard stiffening beam 114. As shown in FIG. 4, the inboard-facing surface of the inboard-stiffening beam 114 may be configured to couple with the battery tray 108, such as to at least partially support the battery tray. Similar to the rocker structure 112, the inboard stiffening beam 114 can be defined by another formed metal sheet. The metal sheet of the inboard stiffening beam 114 has bends along the length of the inboard stiffening beam that define at least one an enclosed tubular shape, such as the multi-tubular shape shown in FIG. 5. Specifically, the metal sheet of the inboard stiffening beam 114 is roll formed to provide a mono-leg shaped profile defined by an upper tubular section and a lower tubular section that share a common center wall 144. More specifically, the metal sheet is formed to displace the lateral portions of the metal sheet that extend from the opposing ends of the center wall 144 in the same rotational direction around the center wall 144. The lateral portions of the metal sheet are successively imparted with longitudinal bends in a process, such as a result of passing the sheet through a series of roll-forming tools, which displaces the edges 46a, 46b of the metal sheet at or near the center wall 144. In doing so, the upper tubular section encloses an upper elongated hollow area 148 and the lower tubular section encloses a lower elongated hollow area 150, which are separated by the center wall 144.

To enclose the tubular or multi-tubular shapes of the inboard stiffening beam 114, the edge portions of the metal sheet are welded continuously or intermittently along the length of the inboard stiffening beam 114. The outboard-positioned edge 46a of the metal sheet shown in FIG. 5 is bent into the upper elongated hollow area 148 and attached via welding to the upper surface of the center wall 144, such as with a seam weld. The inboard-positioned edge 146b of the metal sheet is attached via welding to the inner side wall 142 slightly above the inboard end of the center wall 144 in a lap joint configuration. The inner and outer wall sections of the respective upper and lower tubular sections are substantially aligned with each other in a vertical orientations to form the respective inner and outer side walls 140, 142. Also, the upper and lower walls 136, 138 and the center wall 144 are in substantially parallel alignment with each other and generally in a horizontal orientation.

Figure 9:
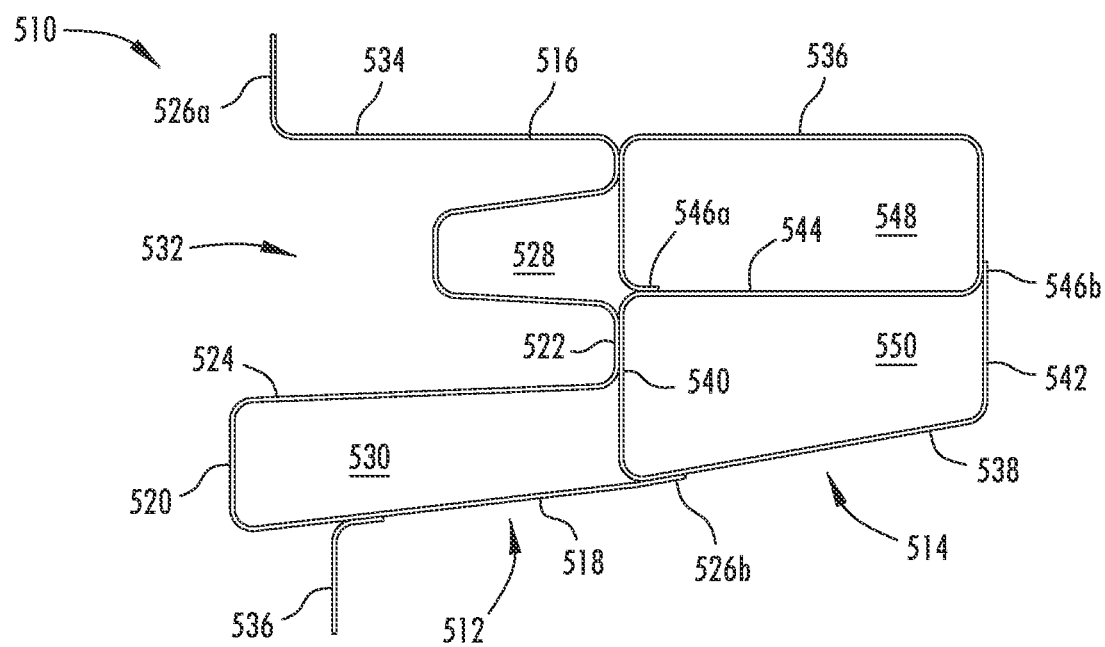

As shown in FIG. 5, a lateral load path that is generally defined along in the planar extent of the intermediate wall 124 of the rocker structure. The lateral load path in this implementation intersects with the lower tubular section of the inboard stiffening beam 114, such that the lateral load path extends from the outer side wall 120 of the rocker structure 112 to an inner side wall 142 of the inboard stiffening beam 114 along a portion of the lower tubular section, such as through both the center wall 144 and the lower wall 138. In other examples, such as shown in FIGS. 5 and 9, the planar extent of the intermediate wall substantially aligns with a wall of the inboard stiffening beam. In FIG. 5, the upper walls 116, 136 are aligned with each other to define a lateral impact load path that extends from an outer side wall of the rocker structure to an inner side wall of the inboard stiffening beam. Also, the aligned upper walls 116, 136 of the rocker structure 112 and the inboard stiffening beam 114 may together form and/or support the floor section 134.

The rocker structure 112 and the inboard stiffening beam 114 are each formed with a metal sheet, which may be the same or different type of metal. For example, one or both of the metal sheets may include a martensitic steel with a tensile strength of at least 1,500 MPa, such as 1,500 MPa or 1,700 MPa. Further, the metal sheets may have a thickness of about 1.4 mm, and in some examples may be approximately between 1 mm and 1.8 mm or more generally between 0.8 mm to 3.0 mm. In additional examples, the rocker structure and the inboard stiffening beam may have different shapes and orientations from that illustrated and may include alternative dimensions and proportions, such as for use with different types of vehicles.

Referring now to FIGS. 6-13, some additional examples of the side frame assembly are provided to illustrate additional concepts, designs, and optional features. Specifically, the additional concepts illustrated are side frame assemblies 210, 310, 410, 510, 610, 710, 810, and 910, each of which include some like features to those described with reference to the side frame assembly 10 shown in FIGS. 1-5, such that duplicative description is omitted and like reference number incremented by the respective hundreds place are understood to describe the corresponding labeled features, unless explicitly shown or described to the contrary.

Figure 6:
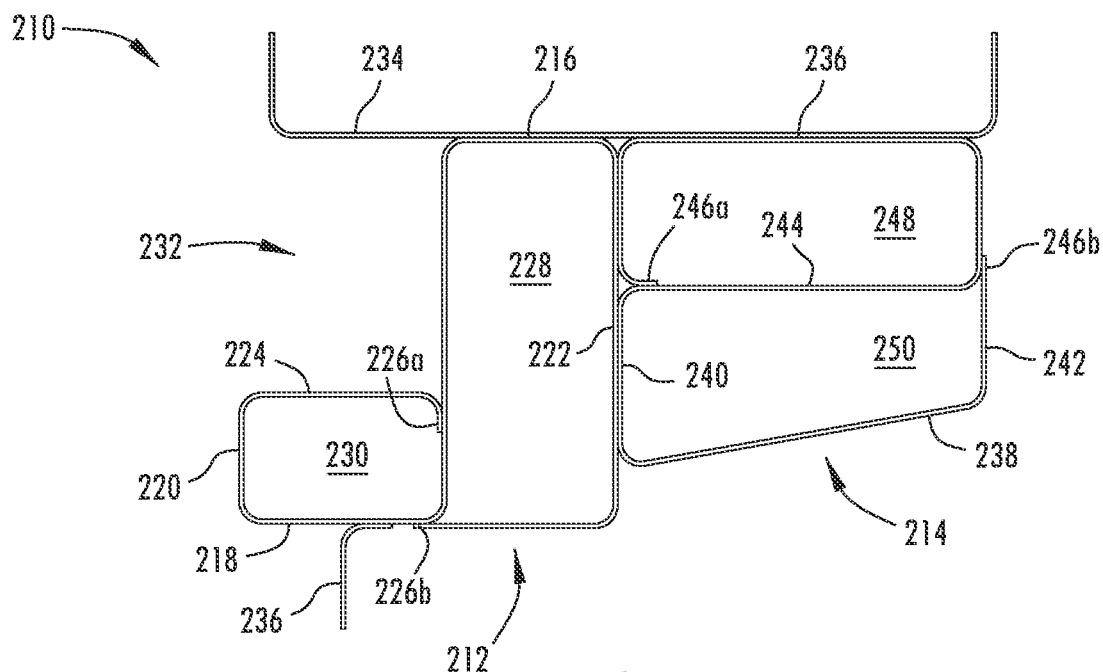
FIGS. 6-13 are cross-sectional views of additional examples of side frame assemblies in accordance with the present disclosure.

With respect to the side frame assembly 210 shown in FIG. 6, the rocker structure 212 is altered from the rocker structure 112 to have the elongated hollow sections side-by-side. In other words, the upper elongated hollow section 228 is inboard relative to the lower elongated hollow section 230. The intermediate wall 224 provided at the upper wall of the lower elongated hollow section 230 and terminates at the vertical wall that forms the common wall between the upper and lower elongated hollow sections 228, 230. As such, the lateral load path formed by the intermediate wall 224 intersects the upper elongated hollow section 228 and disperses the load path over the inboard stiffening beam 214.

Figure 7:
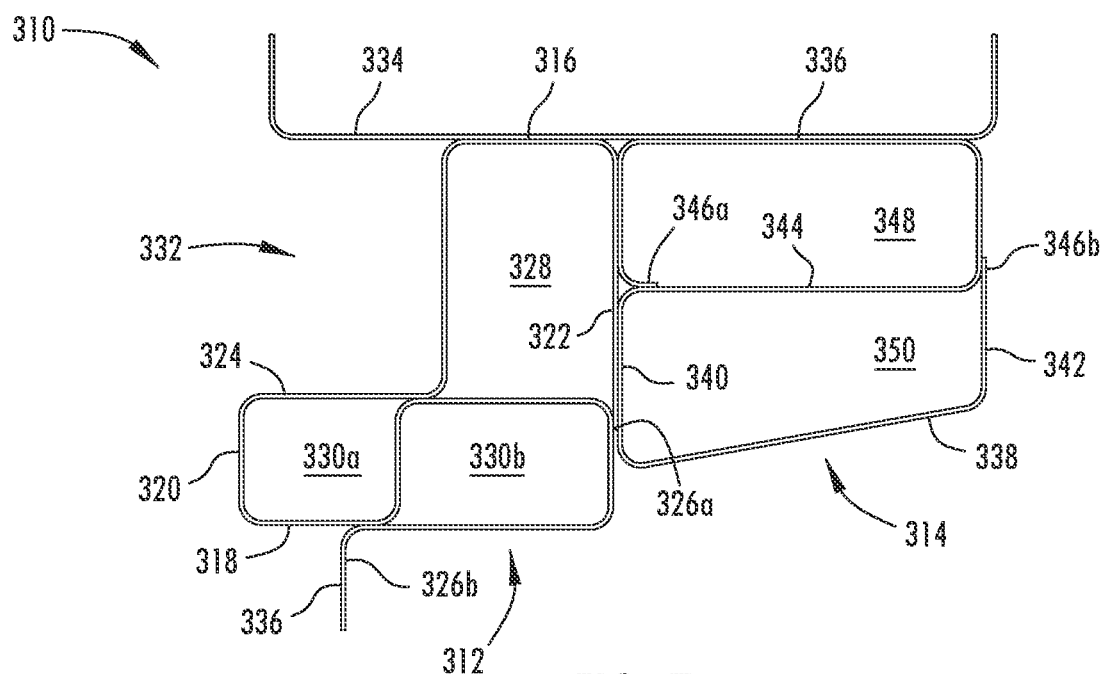

Similar to the side frame assembly 210 shown in FIG. 6, the side frame assembly 310 shown in FIG. 7 has the rocker structure 312 is altered from the rocker structure 112. As shown in FIG. 7, the rocker structure 312 has an upper elongated hollow section 328 and laterally adjacent lower elongated hollow sections 330a, 330b. The intermediate wall 324 extends along separate portions of the metal sheet that border the upper walls of the adjacent lower elongated hollow sections 330a, 330b to form the lateral load path between the outer side wall 320 and the inner side wall 340.

Figure 8:
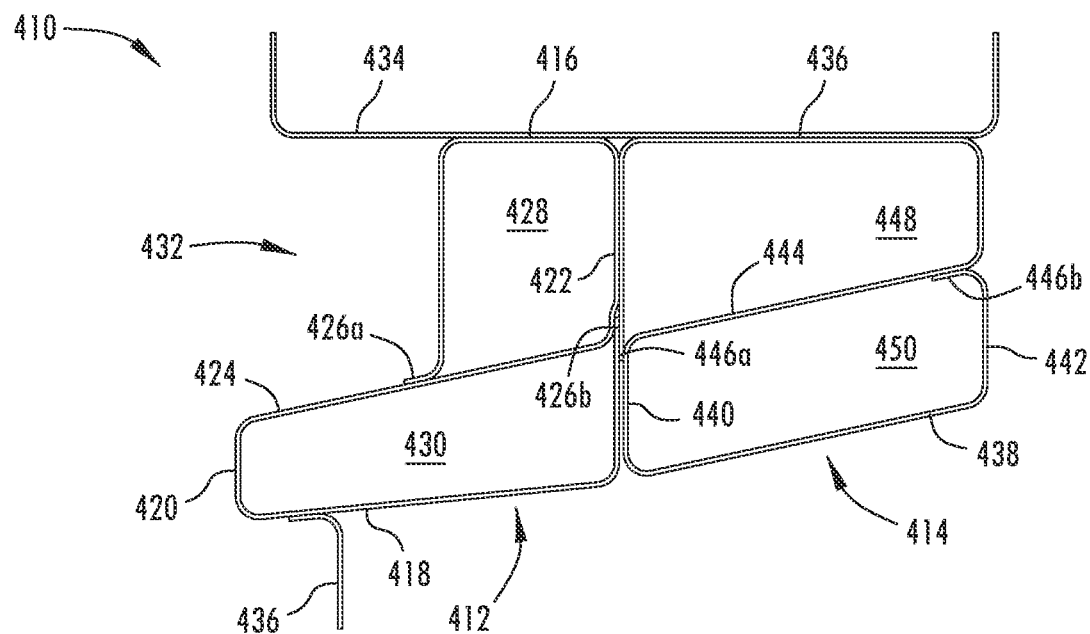

As shown in FIG. 8, the side frame assembly 410 has a rocker structure 412 and an inboard stiffening beam 414 that each have the upper walls 416, 436, lower walls 418, 438, and intermediate and center walls 424, 444 disposed in substantially planar aligned with each other to define a separate lateral impact load paths that extends from an outer side wall 420 of the rocker structure 412 to an inner side wall 442 of the inboard stiffening beam 414, each along portions of the respective tubular shapes.

Figure 10:
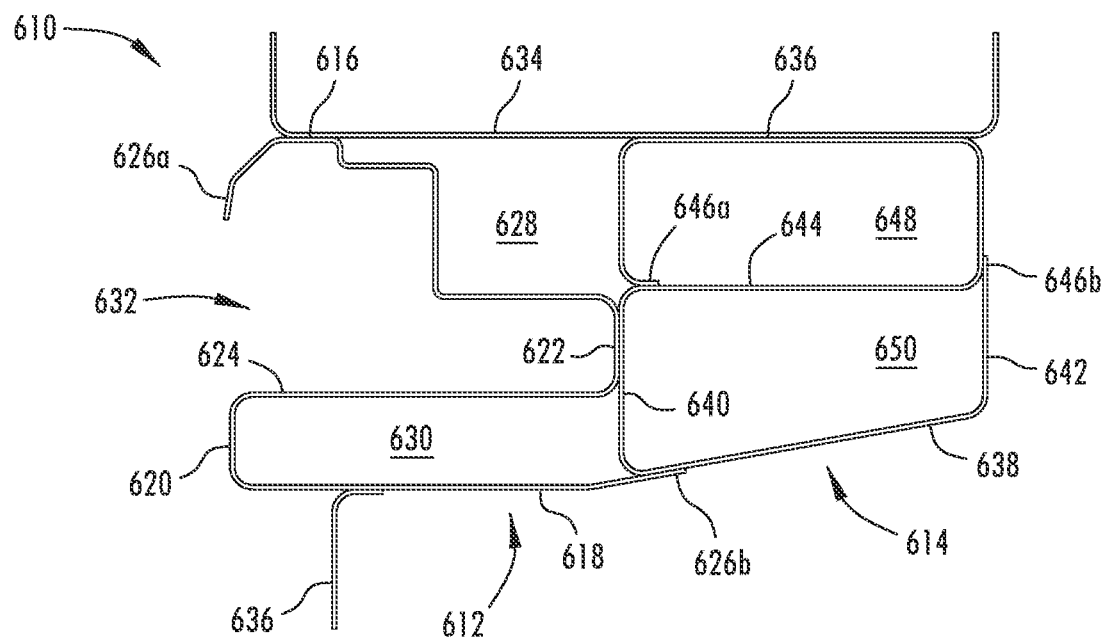

As shown in FIGS. 9 and 10, the side frame assemblies 510, 610 each have rocker structures 512, 612 with an open profile shape. While the open profile itself does not form an enclosed or tubular shape, when attached to the inboard stiffening beam, 514, 614, the open profile forms enclosed areas 528, 530, 628, 630 together with the inboard stiffening beam 514, 614 and the floor section 534, 634.

Figure 11:
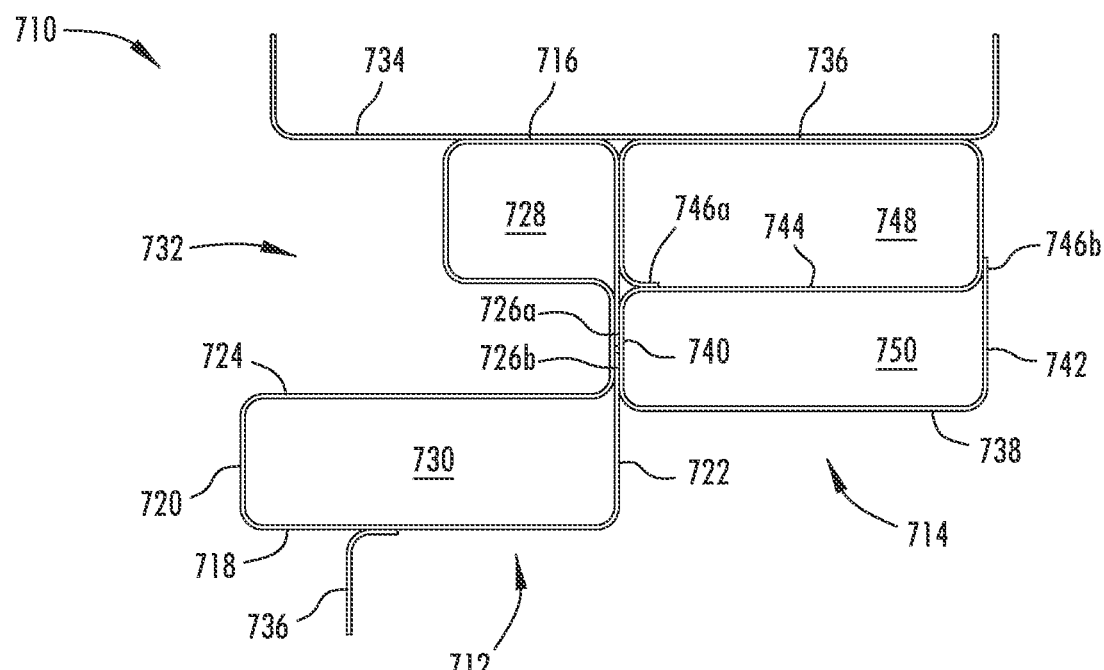
Figure 12:
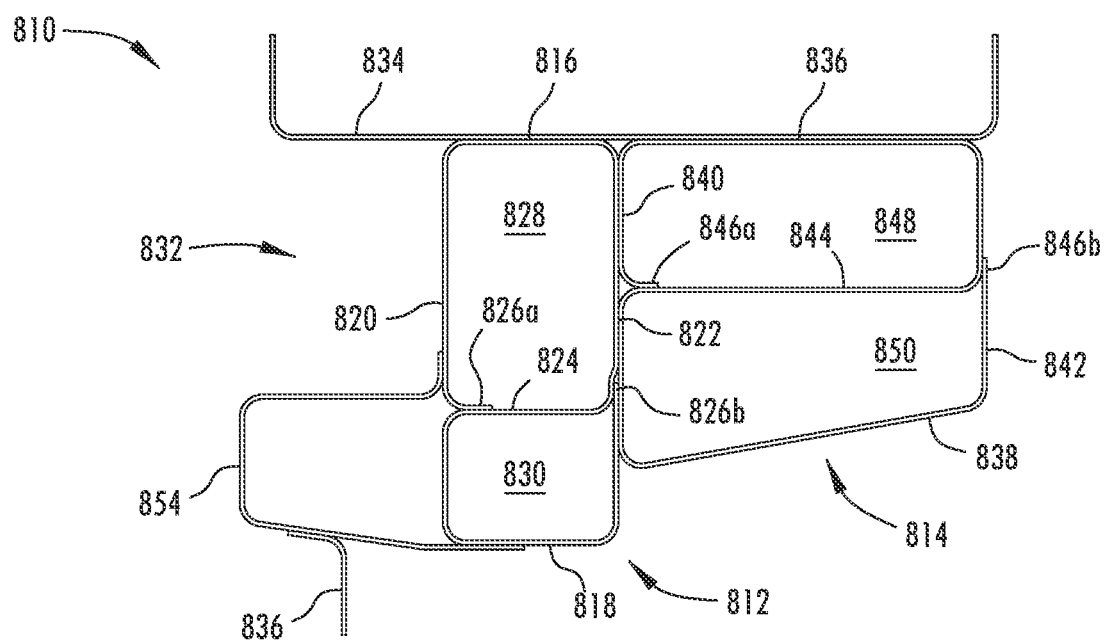
Figure 13:
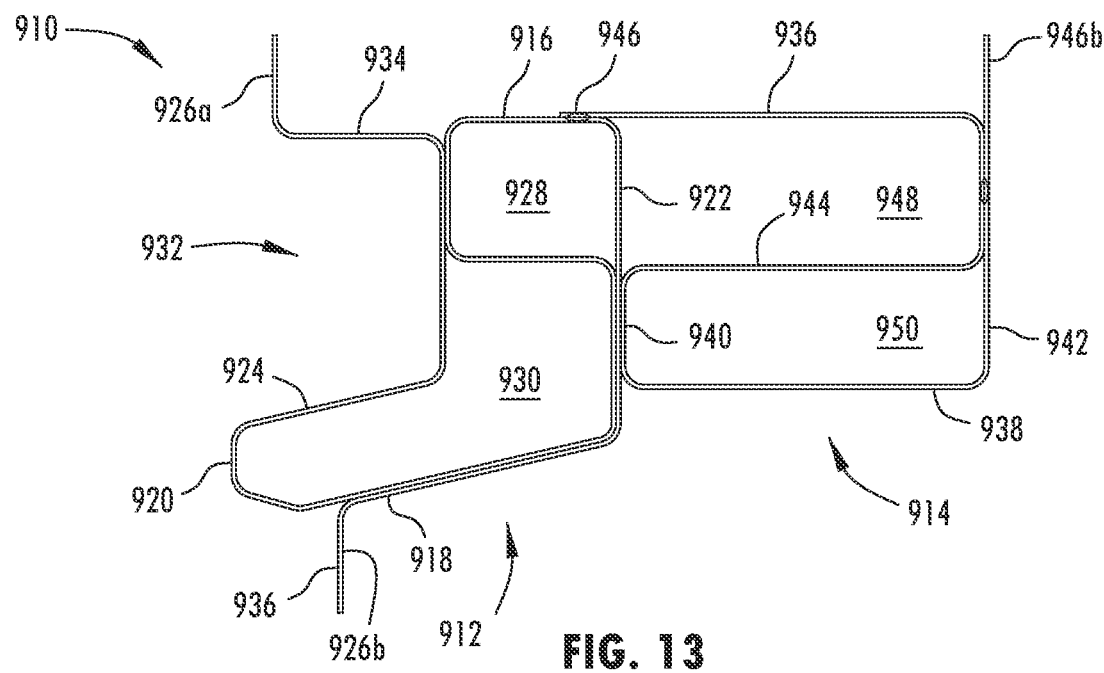

As shown in FIGS. 11 and 13, the rocker structures 712, 912 are formed in alternative cross-sectional shapes to provide similar structural features, but with the reorientation of the edges 726a, 726b, 926a, 926b of the sheet. For example, in FIG. 13, the edges 926a, 926b of the sheet are oriented to integrally form at upper and lower flanges of the rocker structure 912. Also in FIG. 13, the inboard stiffening beam has an alternative cross-sectional shape with the edges 946A, 946b also used as upper connection flanges. With respect to the rocker structure 812 shown in FIG. 12, an outboard member 854 is attached at the beam formed by the metal sheet to provide an outboard extension to form the channel 832 and extend the intermediate wall 824 for providing a lateral impact load path laterally across the side frame assembly 810.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Also for purposes of this disclosure, the terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A side frame assembly for a vehicle, the side frame assembly comprising:
    a rocker structure having an upper wall, a lower wall, and an inner wall together extending along a length of the rocker structure, the rocker structure comprising a first metal sheet that has longitudinal bends along a length of the rocker structure separating the upper wall, the lower wall, and the inner wall of the rocker structure; and an inboard stiffening beam disposed along an inboard-facing surface of the inner wall of the rocker structure, the inboard stiffening beam comprising a second metal sheet formed to define an enclosed tubular shape along a length of the inboard stiffening beam, the enclosed tubular shape having at least one of a planar upper wall or a planar lower wall, wherein a planar extent of the planar upper wall or the planar lower wall intersects a portion of the rocker structure to form a lateral load path from the rocker structure to the enclosed tubular shape of inboard stiffening beam.

2. The side frame assembly of claim 1, wherein the planar extent of the planar lower wall of the enclosed tubular shape of the inboard stiffening beam intersects the inner wall of the rocker structure.

3. The side frame assembly of claim 1, wherein the planar extent of the planar upper wall of the enclosed tubular shape of the inboard stiffening beam intersects the inner wall of the rocker structure.

4. The side frame assembly of claim 1, wherein the enclosed tubular shape of the inboard stiffening beam comprises two separate tubular sections that share a common center wall.

5. The side frame assembly of claim 4, wherein a planar extent of the common center wall intersects the inner wall of the rocker structure.

6. The side frame assembly of claim 1, wherein an inboard-facing surface of the inboard-stiffening beam is configured to couple with a battery tray.

7. The side frame assembly of claim 1, wherein the upper wall of the rocker structure is substantially aligned with or intersecting a portion of the inboard stiffening beam.

8. The side frame assembly of claim 1, wherein the inboard stiffening beam comprises an upper tubular section and a lower tubular section along the length of the inboard stiffening beam.

9. The side frame assembly of claim 8, wherein the second metal sheet forms the upper tubular section and a third metal sheet forms the lower tubular section, and wherein the second metal sheet is coupled to the third metal sheet along the length of the inboard stiffening beam.

10. The side frame assembly of claim 1, wherein the second metal sheet includes longitudinal bends that form a multi-tubular shape.

11. The side frame assembly of claim 1, wherein the rocker structure includes a stiffening insert disposed at the outboard-facing surface of the inner wall.

12. The side frame assembly of claim 1, wherein the rocker structure further comprises an upper flange extending upward from the upper wall, the upper flange configured to attach to an outer sill.

13. The side frame assembly of claim 1, wherein the first and second metal sheets each comprise a martensitic steel with a tensile strength of at least 1,500 MPa.

14. A side frame assembly for a vehicle, the side frame assembly comprising:
a rocker structure having a first metal sheet extending along a length of the rocker structure; and
an inboard stiffening beam disposed along an inboard-facing surface the rocker structure, the inboard stiffening beam comprising a second metal sheet extending at least partially along the length of the rocker structure,
wherein the second metal sheet is formed to define a tubular shape with a planar wall bordering the tubular shape,
wherein the planar wall of the inboard stiffening beam defines a lateral impact load path that extends from an outer side wall of the rocker structure to an inner side wall of the inboard stiffening beam along the planar wall of the tubular shape, and
wherein the second metal sheet includes longitudinal bends that form a multi-tubular shape.

15. The side frame assembly of claim 14, wherein the rocker structure comprises an upper wall, a lower wall, and an inner wall together extending along a length of the rocker structure, wherein an outer wall of the inboard stiffening is coupled with the inner wall of the rocker structure, wherein the planar wall of the tubular shape comprises a lower wall of the inboard stiffening beam, and wherein a planar extent of the planar wall intersects the inner wall of the rocker structure.

16. The side frame assembly of claim 14, wherein the tubular shape of the inboard stiffening beam comprises two separate tubular sections that share a common center wall.

17. The side frame assembly of claim 14, wherein the inboard stiffening beam comprises an upper tubular section and a lower tubular section along the length of the inboard stiffening beam.

18. The side frame assembly of claim 17, wherein the second metal sheet forms the upper tubular section and a third metal sheet forms the lower tubular section, and wherein the second metal sheet is coupled to the third metal sheet along the length of the inboard stiffening beam.

19. A side frame assembly for a vehicle, the side frame assembly comprising:
a rocker structure comprising an inner sill having an upper wall, a lower wall, and an inner wall together extending along a length of the rocker structure, the inner sill comprising a first metal sheet that has longitudinal bends along a length of the rocker structure separating the upper wall, the lower wall, and the inner wall of the inner sill; and
an inboard stiffening beam disposed along an inboard-facing surface of the inner wall of the inner sill, the inboard stiffening beam comprising a second metal sheet formed to define two enclosed tubular shapes along a length of the inboard stiffening beam, and at least one of the two enclosed tubular shapes having at least one planar lower wall,
wherein a planar extent of the planar lower wall intersects the inner wall of the inner sill to form a lateral load path from the rocker structure to the inboard stiffening beam.

* * * * *